(12) United States Patent
Kodama et al.

(10) Patent No.: US 9,331,849 B2
(45) Date of Patent: May 3, 2016

(54) INFORMATION SETTING METHOD AND WIRELESS COMMUNICATION SYSTEM

(71) Applicant: Yokogawa Electric Corporation, Musashino-shi, Tokyo (JP)

(72) Inventors: Kazutoshi Kodama, Tokyo (JP); Hirotsugu Gotou, Tokyo (JP); Kazunori Miyazawa, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 94 days.

(21) Appl. No.: 14/257,545

(22) Filed: Apr. 21, 2014

(65) Prior Publication Data

US 2014/0351591 A1 Nov. 27, 2014

(30) Foreign Application Priority Data

May 24, 2013 (JP) ................................. 2013-110252

(51) Int. Cl.
| | |
|---|---|
| *H04L 9/08* | (2006.01) |
| *H04L 9/32* | (2006.01) |
| *H04W 12/08* | (2009.01) |
| *H04L 29/06* | (2006.01) |
| *H04W 12/04* | (2009.01) |

(52) U.S. Cl.
CPC ............ *H04L 9/0825* (2013.01); *H04L 9/3263* (2013.01); *H04W 12/08* (2013.01); *H04L 63/0492* (2013.01); *H04L 63/062* (2013.01); *H04W 12/04* (2013.01); *Y02P 90/18* (2015.11)

(58) Field of Classification Search
None
See application file for complete search history.

(56) References Cited

U.S. PATENT DOCUMENTS

| | | | |
|---|---|---|---|
| 2008/0077534 A1* | 3/2008 | Son | ........................ G06Q 20/02 705/76 |
| 2009/0063861 A1* | 3/2009 | Chu | .................... H04L 63/0442 713/171 |

(Continued)

FOREIGN PATENT DOCUMENTS

| | | |
|---|---|---|
| JP | 201229225 A | 2/2012 |
| JP | 2012-213125 A | 11/2012 |

(Continued)

OTHER PUBLICATIONS

Shuji Yamamoto, et al., "World's First Wireless Field Instruments Based on ISA100.11a", Yokogawa Technical Report, 2010, 8 pages, vol. 53, No. 2.

*Primary Examiner* — Kaveh Abrishamkar
(74) *Attorney, Agent, or Firm* — Sughrue Mion, PLLC (57) ABSTRACT

An information setting method for a setting device includes the following processes. A first certificate and identification information are obtained from a wireless device to be caused to join a wireless network managed by a management device. The first certificate certifies that the wireless device is a formal wireless device and includes a first public key. The identification information is information that identifies the wireless device. A second certificate is obtained from the management device. The second certificate certifies that the management device is a formal management device and includes a second public key. Apparatus information required for the wireless device to join the wireless network is encoded using the first public key and is output to the wireless device. Management information including the apparatus information and the identification information associated with the apparatus information is encoded using the second public key and is output to the management device.

17 Claims, 7 Drawing Sheets

(56) References Cited

U.S. PATENT DOCUMENTS

2009/0296601 A1* 12/2009 Citrano, III ........... H04L 63/062
                                                          370/254
2010/0049984 A1*  2/2010 Masushio ............. H04L 9/3247
                                                          713/179
2010/0290351 A1  11/2010 Toepke et al.
2013/0318343 A1* 11/2013 Bjarnason ............. H04L 63/061
                                                          713/157

FOREIGN PATENT DOCUMENTS

JP      2012527056 A    11/2012
WO      2010132761 A2   11/2010

* cited by examiner

INFORMATION SETTING METHOD AND WIRELESS COMMUNICATION SYSTEM

BACKGROUND OF THE INVENTION

1. Field of the Invention

The present invention relates to an information setting method and a wireless communication system.

Priority is claimed on Japanese Patent Application No. 2013-110252, filed May 24, 2013, the content of which is incorporated herein by reference.

2. Description of the Related Art

Recently, wireless communication systems have been implemented in plants, factories, or the like. In such a wireless communication system, site apparatuses (a measurement unit, an operation unit) called "wireless field apparatuses" which can perform wireless communication are provided in plants or the like, and control signals for controlling the wireless field apparatuses, measurement signals acquired by the wireless field apparatuses, and the like, are transmitted via a wireless communication network. The communication standard used for such a wireless communication system includes industrial wireless communication standards, such as ISA100.11a and WirelessHART (trademark).

For wireless devices such as the above wireless field apparatus to join the wireless communication network, it is necessary to set apparatus information (network parameters and security parameters) to the wireless device (this process is called "provisioning"). Provisioning methods include OTA (over the air) provisioning and OOB (out-of-band) provisioning. The OTA provisioning is a method such that provisioning is performed by wireless communication via the wireless communication network. On the other hand, the OOB provisioning is a method such that provisioning is performed by a communication means (such as infrared communication) different from wireless communication via the wireless communication network.

The wireless device having subjected to the provisioning transmits a join request (a request for joining the wireless network) to a management device of the wireless communication system at the time of joining the wireless network. The management device having received the join request performs an authentication process using information included in the join request (specifically, a join key). If the authentication succeeds, the management device allows the joining of the wireless device having transmitted the join request. If the authentication fails, the management device rejects the joining of the wireless device having transmitted the join request. Thus, a process of joining the wireless network is performed.

Shuji Yamamoto et al. "World's First Wireless Field Instruments Based on ISA100.11a", Yokogawa Technical Report, Vol. 53, No. 2, 2010, discloses a provisioning device (apparatus parameter setting tool) that performs the aforementioned OOB provisioning on a wireless field apparatus caused to join a wireless network. Additionally, Japanese Patent Application Laid-Open Publication No. 2012-213125 discloses a provisioning device intended to enhance mutual connectivity with a wireless field apparatus.

The aforementioned OOB provisioning is classified into two methods. One method is a first provisioning method in which apparatus information (such as a join key) is generated and set by the same apparatus. The other method is a second provisioning method in which the apparatus information is generated and set by different apparatuses. Specifically, in the first provisioning method, the join key is generated and set by a provisioning device. On the other hand, in the second provisioning method, the join key is generated by a management device (manager) that manages a wireless network and is set by a provisioning device.

In a case where provisioning is performed by the first provisioning method, the provisioning device associates the set join key with an identifier of the wireless device (such as an EUI64 address), and the associated information is given and set to the manager. On the other hand, in a case where provisioning is performed by the second provisioning method, the identifier of the wireless device is given to the manager, the manager associates the join key with the identifier of the wireless device, and the associated information is set to the manager.

Here, various information, such as the aforementioned join key, is transmitted between the provisioning device and the wireless device by infrared communication or the like. On the other hand, various information is transferred between the provisioning device and the manager by use of a recording medium, such as an USB (universal serial bus) memory. For this reason, security is not ensured between the provisioning device and the wireless device, nor between the provisioning device and the manager.

Therefore, there is a possibility that the join key will be stolen by a malicious person. If the join key is stolen, the wireless network can be invaded, thereby causing security problems.

The present invention has been made in view of the above situations and has an object to provide an information setting method and a wireless communication system which can prevent information required for joining a wireless network from being stolen and thereby enhance the security.

SUMMARY

An information setting method for a setting device according to one embodiment of the present invention includes, but is not limited to, the following processes. A first certificate and identification information are obtained from a wireless device to be caused to join a wireless network managed by a management device. The first certificate certifies that the wireless device is a formal wireless device. The first certificate includes a first public key. The identification information is information that identifies the wireless device. The first certificate and the identification information are stored in the wireless device. A second certificate is obtained from the management device. The second certificate certifies that the management device is a formal management device. The second certificate includes a second public key. Apparatus information required for the wireless device to join the wireless network is encoded using the first public key. The encoded apparatus information is output to the wireless device. Management information including the apparatus information and the identification information associated with the apparatus information is encoded using the second public key. The encoded management information is output to the management device.

An information setting method for a management device according to another embodiment of the present invention includes, but is not limited to the following processes. A first certificate and identification information are obtained from a wireless device to be caused to join a wireless network managed by the management device. The first certificate certifies that the wireless device is a formal wireless device. The first certificate includes a first public key. The identification information is information that identifies the wireless device. The first certificate and the identification information are stored in the wireless device. Apparatus information required for the wireless device to join the wireless network is encoded using the first public key. The encoded apparatus information is output to a setting device configured to set the apparatus information to the wireless device. Management information including the apparatus information and the identification information associated with the apparatus information is generated.

A wireless communication system according to another embodiment of the present invention includes, but is not limited to: a wireless device to be caused to join a wireless network; a management device configured to manage the wireless network; and a setting device. The wireless device stores a first certificate and identification information. The first certificate certifies that the wireless device is a formal wireless device. The first certificate includes a first public key. The identification information is information that identifies the wireless device. The management device stores a second certificate certifying that the management device is a formal management device. The second certificate includes a second public key. The setting device is configured to obtain the first certificate and the identification information from the wireless device. The setting device is configured to obtain the second certificate from the management device. The setting device is configured to encode, using the first public key, apparatus information required for the wireless device to join the wireless network. The setting device is configured to output the encoded apparatus information to the wireless device. The setting device is configured to encode, using the second public key, management information including the apparatus information and the identification information associated with the apparatus information. The setting device is configured to output the encoded management information to the management device.

BRIEF DESCRIPTION OF THE DRAWINGS

The above features and advantages of the present invention will be more apparent from the following description of certain preferred embodiments taken in conjunction with the accompanying drawings.

DETAILED DESCRIPTION OF THE PREFERRED EMBODIMENTS

The present invention will now be described herein with reference to illustrative embodiments. The accompanying drawings explain an information setting method and a wireless communication system of the embodiments. The size, the thickness, and the like of each illustrated portion might be different from those of each portion of an actual system or device.

Those skilled in the art will recognize that many alternative embodiments can be accomplished using the teachings of the present invention and that the present invention is not limited to the embodiments illustrated herein for explanatory purposes.

(First Embodiment)

Figure 1:
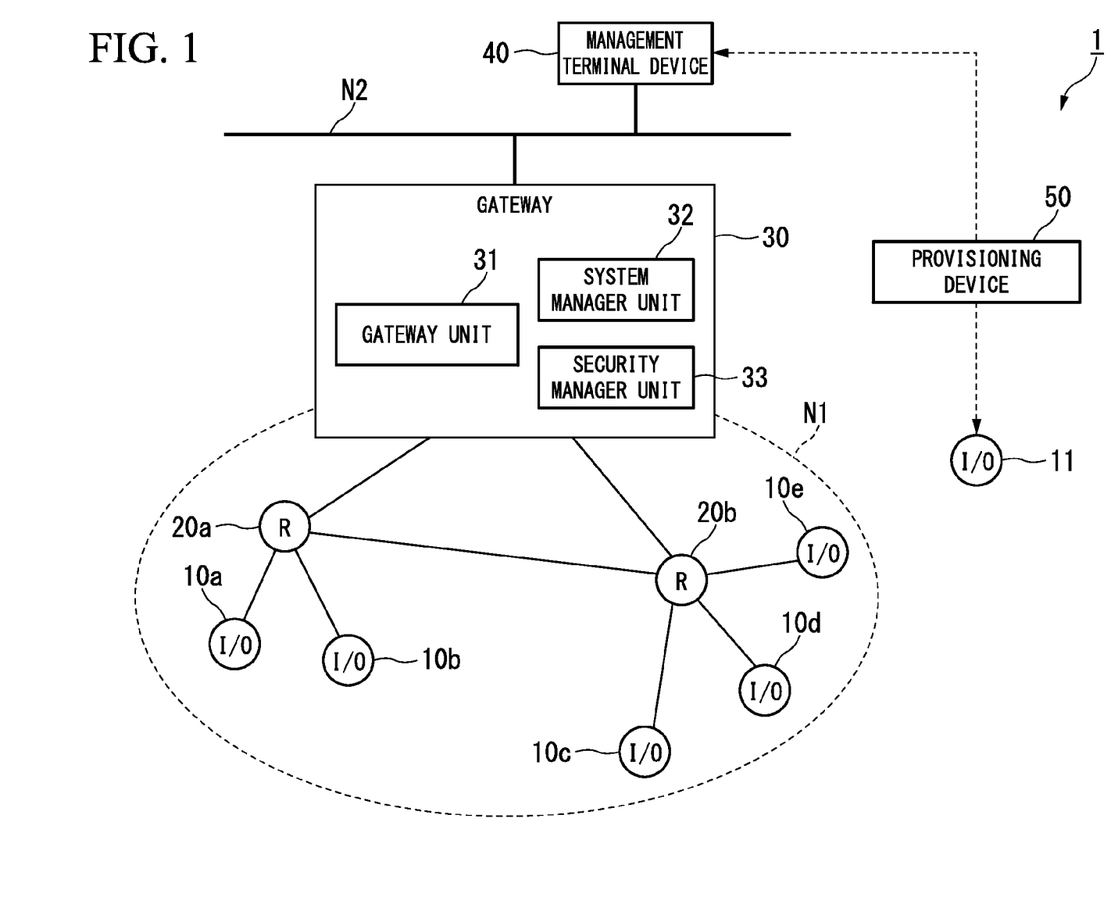
FIG. 1 is a block diagram illustrating the entire configuration of a wireless communication system according to a first embodiment of the present invention.

FIG. 1 is a block diagram illustrating the entire configuration of a wireless communication system 1 according to a first embodiment of the present invention. As shown in FIG. 1, the wireless communication system 1 of the present embodiment includes: an I/O device 10a to 10e; an I/O device 11 (wireless device); routing devices 20a and 20b; a gateway 30; a management terminal device 40; a provisioning device 50 (setting device). Wireless communication via a wireless network N1 is available in the wireless communication system 1.

The wireless network N1 shown in FIG. 1 is formed by the wireless devices 10a to 10e, the routing devices 20a and 20b, and the gateway 30. The wireless network N1 is characterized by low power consumption and low speed (narrow communication band). Additionally, a plant network N2, to which the gateway 30 and the management terminal device 40 are connected, is a wired network that is the backbone network of the wireless communication system 1 and is characterized as wideband.

Here, the I/O devices 10a to 10e denote I/O devices that have already joined the wireless network N1. The I/O device 11 denotes an I/O device that is about to join the wireless network N1. The number of the I/O devices 10a to 10e, the number of the I/O devices 11, and the number of the routing devices 20a and 20b are not limited to a specific number.

The I/O devices 10a to 10e and the I/O device 11 include, for example: a sensor apparatus, such as a flow meter and a temperature sensor; a valve apparatus, such as a flow control valve and an on-off valve; an actuator apparatus, such as a fan and a motor; and other field apparatuses to be installed at sites, such as plants and factories. The I/O devices 10a to 10e and the I/O device 11 can perform wireless communication based on ISA100.11a that is the wireless communication standard for industrial automation.

Additionally, the I/O devices 10a to 10e and the I/O device 11 have a function of performing infrared communication and can transmit/receive various information to/from external infrared communication apparatuses. For this reason, for example, the I/O device 11 having not joined the wireless network N1 performs infrared communication with the provisioning device 50, thereby obtaining apparatus information required for joining the wireless network N1. Here, the apparatus information required for joining the wireless network N1 includes: a network ID assigned to the wireless network N1; a join key that is a password required at the time of joining the wireless network N1; and the like.

Further, each of the I/O devices 10a to 10e and the I/O device 11 stores therein: a certificate indicating that each device is the formal I/O device (a certificate C1 shown in FIG. 3; first certificate); and a private key associated with a public key included in the certificate. The certificate and the private key are used to prevent the above apparatus information required for joining the wireless network N1 from being stolen, thereby enhancing the security. Here, each of the I/O devices 10a to 10e and the I/O device 11 also stores therein identification information that identifies the device (specifically, "EUI64" that is 64-bit identification information).

The routing devices 20a and 20b perform wireless communication based on ISA100.11a among the I/O devices 10a to 10e and the gateway 30 to transmit information concerning paths of the wireless network N1 and messages and to relay data among the I/O devices 10a to 10e and the gateway 30. The I/O devices 10a to 10e, the routing devices 20a and 20b, and the gateway 30 are wirelessly connected to one another, thereby forming star and mesh wireless network N1. Here, an I/O device having the functions of the routing devices 20a and 20b (relay function) may be provided in lieu of the routing devices 20a and 20b.

The gateway 30 includes: a gateway unit 31; a system manager unit 32; and a security manager unit 33 (management device). The gateway 30 controls communication performed in the wireless communication system 1. The gateway unit 31 connects the wireless network N1 formed by the I/O devices 10a to 10e and the like to the plant network N2 to which the management terminal device 40 is connected. The gateway unit 31 relays various data among the I/O devices 10a to 10e, the management terminal device 40, and the like. The gateway unit 31 performs wireless communication based on the aforementioned wireless communication standard ISA100.11a.

The system manager unit 32 manages and controls wireless communication performed via the wireless network N1. Specifically, the system manager unit 32 manages and controls resources, such as frequency channels, communication schedules, and communication paths of the wireless network N1, and the like. Additionally, the system manager unit 32 cooperates with the security manager unit 33 and performs a joining process of causing the I/O device 11 to join the wireless network N1.

The security manager unit 33 manages security under control of the system manager unit 32. For example, provisioning information (management information), which indicates an I/O device allowed to join the wireless network N1, is registered to the security manager unit 33. The security manager unit 33 refers to the provisioning information, thereby managing the I/O devices currently joining the wireless network N1. Here, the system manager unit 32 refers to information included in the aforementioned list registered to the security manager unit 33, thereby performing the aforementioned joining process.

Further, the security manager unit 33 stores: a certificate (a certificate C2 shown in FIG. 3; second certificate) indicating that the security manager unit 33 is a formal manager (management device); and a private key associated with the public key included in the certificate, similarly to the I/O devices 10a to 10e and the I/O device 11. The certificate and the private key are also used to prevent the apparatus information required for joining the wireless network N1 from being stolen, and to thereby enhance the security.

The management terminal device 40 is connected to the plant network N2. For example, the management terminal device 40 is operated by an operator of the wireless communication system 1. In accordance with an instruction received from the operator, the management terminal device 40 performs collection of data measured by the I/O devices 10a to 10e, setting of parameters to the I/O devices 10a to 10e, and the like. Additionally, in accordance with an instruction received from the operator, the management terminal device 40 also performs a process of reading provisioning information generated by the provisioning device 50 and registering the read provisioning information to the security manager unit 33 of the gateway 30.

The provisioning device 50 is operated by a worker who installs the I/O device 11 having not joined the wireless network N1, and performs setting of various information to the I/O device 11. Specifically, the provisioning device 50 generates apparatus information including the join key and the like which are required for causing the I/O device 11 to join the wireless network N1. Then, the provisioning device 50 performs provisioning on the I/O device 11, thereby setting the generated apparatus information to the I/O device 11.

Here, the provisioning device 50 has functions of infrared communication or serial communication such as RS-232C. For this reason, the provisioning device 50 can perform the OOB provisioning in which provisioning is performed by a communication means different from wireless communication via the wireless network N1 (infrared communication and serial communication such as RS-232C). Additionally, the provisioning device 50 generates provisioning information in which the apparatus information such as the join key set to the I/O device 11 by provisioning is associated with identification information allocated to the I/O devices 11 having been subjected to the provisioning.

In a case where the OOB provisioning is performed, the provisioning device 50 encodes the apparatus information using the public key included in the certificate acquired by the I/O device 11 and then transmits the encoded apparatus information to the I/O device 11. Additionally, in a case where the provisioning information is generated, the provisioning device 50 encodes the provisioning information using the public key included in the certificate obtained from the security manager 33 of the gateway 30 and then outputs the encoded provisioning information to the management terminal device 40.

Figure 2:
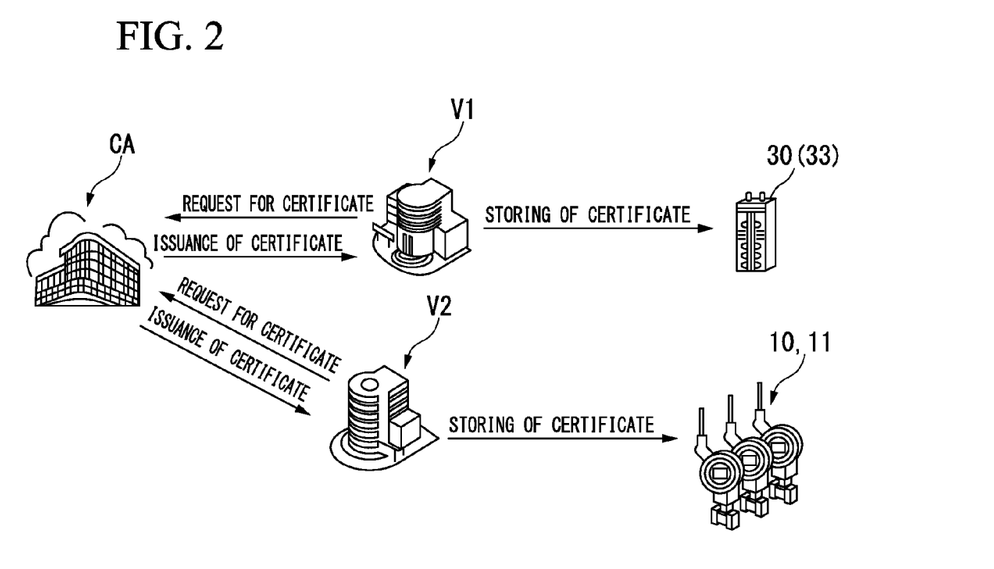
FIG. 2 is a diagram illustrating procedure for issuance and storing of a certificate used in the first embodiment of the present invention.

Next, the certificate used in the present embodiment is explained here. FIG. 2 is a diagram illustrating procedure for issuance and storing of the certificate used in the first embodiment of the present invention. In the present embodiment, a PKI (public key infrastructure) is used to prevent the apparatus information required for joining the wireless network N1 from being stolen. For this reason, a certificate issued by a reliable certificate authority CA is stored in each of the gateway 30 (security manager unit 33), the I/O devices 10 (10a to 10e), and the I/O device 11.

A specific procedure for issuance and storing of a certificate is as follows. First, each of a system vendor V1 that provides the gateway 30 (security manager unit 33) and an apparatus vendor V2 that provides the I/O devices 10 and 11 requests a certificate authority CA that is a reliable third party authority to issue a certificate. The certificates are ones that prove that the gateway 30 provided by the system vendor V1 and the I/O devices 10 and 11 provided by the apparatus vendor V2 are reliable formal products.

Then, the certificate authority receiving the request for issuance of the certificate verifies, by any method, the system vendor V1 and the apparatus vendor V2 which are requesting parties. After the vendors V1 and V2 are properly verified, the certificate authority CA issues the certificates respectively to the system vendor V1 and the apparatus vendor V2. This certificate includes a public key and information that proves an owner (the system vendor V1 or the apparatus vendor V2) and is appended with a signature of the certificate authority CA to avoid falsification. Here, along with the issuance of the certificate, a private key associated with the public key included in the certificate is issued from the certificate authority CA.

Then, the system vendor V1 obtaining the certificate issued from the certificate authority CA stores the certificate and the private key in the gateway 30 (security manager unit 33), and then sells the gateway 30. Similarly, the apparatus vendor V2 obtaining the certificate issued from the certificate authority CA stores the certificate and the private key in the I/O devices 10 and 11, and then sells the I/O devices 10 and 11. Thus, the gateway 30 and the I/O devices 10 and 11, each of which stores the certificate and the private key, are provided from the system vendor V1 and the apparatus vendor V2.

Next, an explanation is given with respect to processing in a case where the I/O device 11 having not joined the wireless network N1 is caused to join the wireless network N1 in the wireless communication system 1 having the above configuration. In order to cause the I/O device 11 to join the wireless network N1, it is necessary to perform provisioning on the I/O device 11, and then cause the I/O device 11 having been subjected to the provisioning to join the wireless network N1. Hereinafter, processing in a case where provisioning is performed on the I/O device 11 (processing at the time of provisioning) and processing in a case where the I/O device 11 having been subjected to the provisioning is caused to join the wireless network N1 (processing at the time of joining) are sequentially explained.

(Processing at Time of Provisioning)

Figure 3:
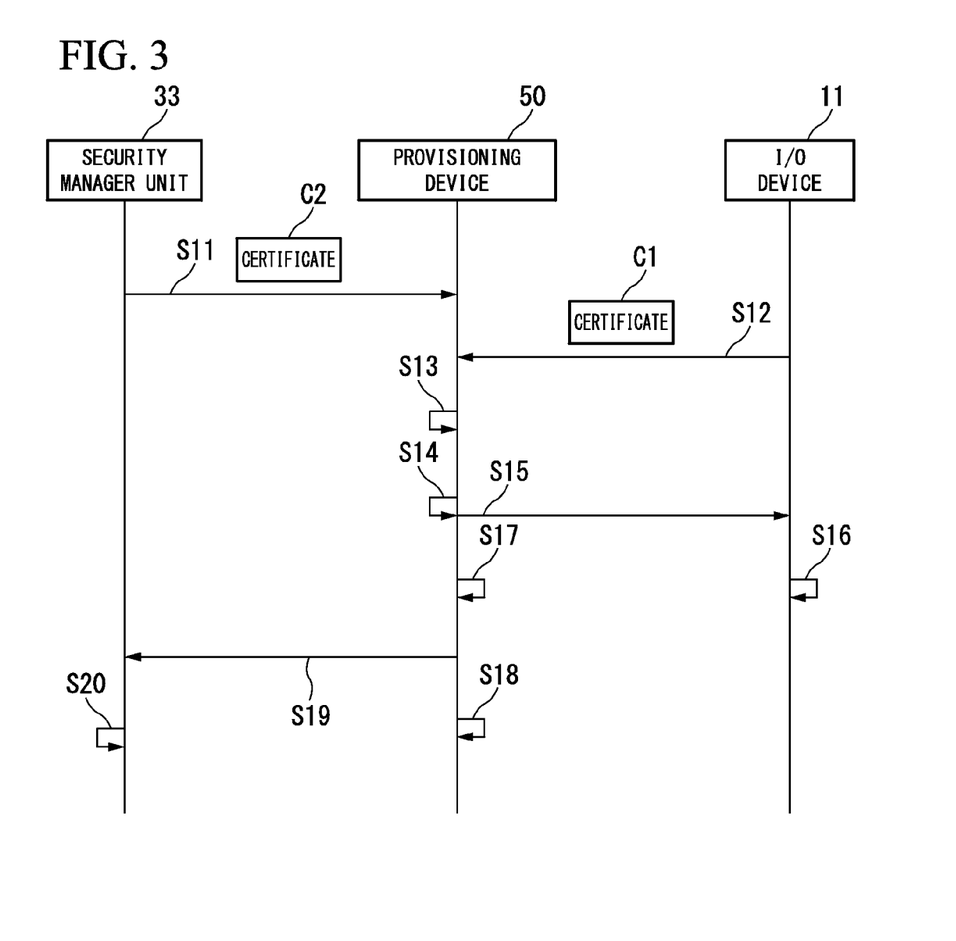
FIG. 3 is a timing chart illustrating processing at the time of provisioning according to the first embodiment of the present invention.

FIG. 3 is a timing chart illustrating processing at the time of provisioning according to the first embodiment of the present invention. First, before provisioning is initiated, a worker obtains the certificate C2 stored in the security manager unit 33 of the gateway 30 and inputs the obtained certificate C2 to the provisioning device 50 (step S11: first step). For example, the worker obtains a USB memory storing a copy of the certificate C2 and attaches the USB memory onto the provisioning device 50, thereby inputting the certificate C2 to the provisioning device 50. After this process, the provisioning is initiated.

After the provisioning is initiated, the worker operates an operation unit (not shown) of the provisioning device 50, thereby inputting to the provisioning device 50, an instruction to obtain the certificate C1 stored in the I/O device 11. Then, infrared communication is performed between the provisioning device 50 and the I/O device 11, thus transmitting and inputting to the provisioning device 50, the certificate C1 and the identification information (such as "EUI64"), which are stored in the I/O device 11 (step S12: first step).

Then, the provisioning device 50 generates a join key to be set to the I/O device 11 (step S13). After the join key is generated, the provisioning device 50 performs a process of encoding the join key using the public key included in the certificate C1 obtained from the I/O device 11 (step S14: second step). After the encoding is completed, infrared communication is performed between the provisioning device 50 and the I/O device 11, thus transmitting the encoded join key to the I/O device 11 (step S15: second step).

Here, for simplification of explanation, the join key exemplifies the information transmitted from the provisioning device 50 to the I/O device 11 (apparatus information). However, information other than the join key is also transmitted thereto. For example, a network ID allocated to the wireless network N1, tag information allocated to the I/O device 11 (device tag), and other information are transmitted.

Upon receiving the encoded join key from the provisioning device 50, the I/O device 11 performs a process of decoding the join key using the private key stored in the I/O device 11 (step S16). The decoded join key is set to the I/O device 11 and is used when the I/O device 11 joins the wireless network N1 (at the time of "joining" as will be explained later).

On the other hand, the provisioning device 50 having completed the transmission of the encoded join key (step S15) performs a process of generating and encoding provisioning information (step S17: third step). Specifically, the provisioning device 50 generates provisioning information in which the identification information obtained from the I/O device 11 in step S12 is associated with the join key generated in step S13. Then, the provisioning device 50 encodes the provisioning information using the public key included in the certificate C2 input in step S11.

Here, for simplification of explanation, an example where provisioning is performed on one I/O device 11 has been explained. In a case where there are multiple I/O devices 11 to be subjected to provisioning, the processes from steps S12 to S17 are repeated a number of times corresponding to the number of I/O devices 11. For this reason, the provisioning device 50 generates sets of provisioning information, the number of which corresponds to the number of I/O devices 11.

After the above processes are completed, the provisioning information generated in step S17 (encoded provisioning information) is output from the provisioning device 50 to the management terminal device 40. For example, the encoded provisioning information is output to the USB memory attached onto the provisioning device 50, and then the USB memory is attached onto the management terminal device 40, thereby inputting the encoded provisioning information to the management terminal device 40. Here, after the encoded provisioning information is output, the provisioning device 50 performs a process of deleting the join key generated in step S13 (step S18: fourth step).

After the encoded provisioning information is input to the management terminal device 40, the encoded provisioning information is transmitted to the gateway 30 via the plant network N2 and is input to the security manager unit 33, based on, for example, an instruction from the worker input by her operation of the management terminal device 40 (step S19: third step). Upon receiving the encoded provisioning information, the security manger unit 33 performs a process of decoding the provisioning information using the private key stored in the security manger unit 33 (step S20). The decoded provisioning information is set to the security manager unit 33 and is used when the I/O device 11 joins the wireless network N1 (at the time of "joining" as will be explained later). Thus, the provisioning is completed.

(Processing at Time of Joining)

After the provisioning is completed, the I/O device 11 receives advertisements transmitted from the routing devices 20a and 20b. Then, the I/O device 11 transmits a join request (a request for joining the wireless network N1) to each of the routing devices 20a and 20b having transmitted the advertisements. This join request is transmitted to the gateway 30 via the routing devices 20a and 20b.

Upon receiving the join request from the I/O device 11, the system manager 32 of the gateway 30 performs a process of authenticating the I/O device 11 using the join key included in the received join request. Specifically, the system manager 32 confirms whether or not the provisioning information including the join key is set to the security manager unit 33. Then, in a case where the authentication succeeds, the system manager unit 32 allows the joining of the I/O device 11 having transmitted the join request. In a case where the authentication fails, the system manager unit 32 rejects the joining of the I/O device 11 having transmitted the join request. Thus, a process of joining the target network N1 is performed.

As explained above, in the present embodiment, the provisioning device 50 obtains the certificate C1 and the identification information which are stored in the I/O device 11, and the certificate C2 stored in the security manager 33 of the gateway 30. Then, the provisioning device 50 encodes apparatus information (join key) to be set to the I/O device 11, using the public key included in the certificate C1, and outputs the encoded apparatus information to the I/O device 11. Additionally, the provisioning device 50 encodes, using the public key included in the certificate C2, provisioning information in which the apparatus information is associated with the identification information, and outputs the encoded provisioning information to the security manager unit 33 of the gateway 30.

For this reason, the encoded apparatus information is transmitted by infrared communication between the provisioning device 50 and the I/O device 11, thereby preventing the apparatus information required for joining the wireless network N1 from being stolen. Additionally, the encoded provisioning information is transferred via a USB memory between the provisioning device 50 and the security manager unit 33 of the gateway 30, or is transmitted via the planet network N2, thereby preventing the apparatus information included in the provisioning information from being stolen. Thus, it is possible to prevent the apparatus information from being stolen between the provisioning device 50 and the I/O device 11, and between the provisioning device 50 and the security manager unit 33 of the gateway 30, thereby enhancing the security.

(Second Embodiment)

Next, a second embodiment of the present invention is explained here. The entire configuration and basic processing of a wireless communication system of the present embodiment are similar to those of the wireless communication system 1 shown in FIG. 1. However, the wireless communication system of the present embodiment differs from the wireless communication system 1 shown in FIG. 1 in that it is possible to select a scope of encoding apparatus information (including the apparatus information included in the provisioning information output from the provisioning device 50 to the security manager unit 33) to be transmitted from the provisioning device 50 to the I/O device 11.

Figure 4:
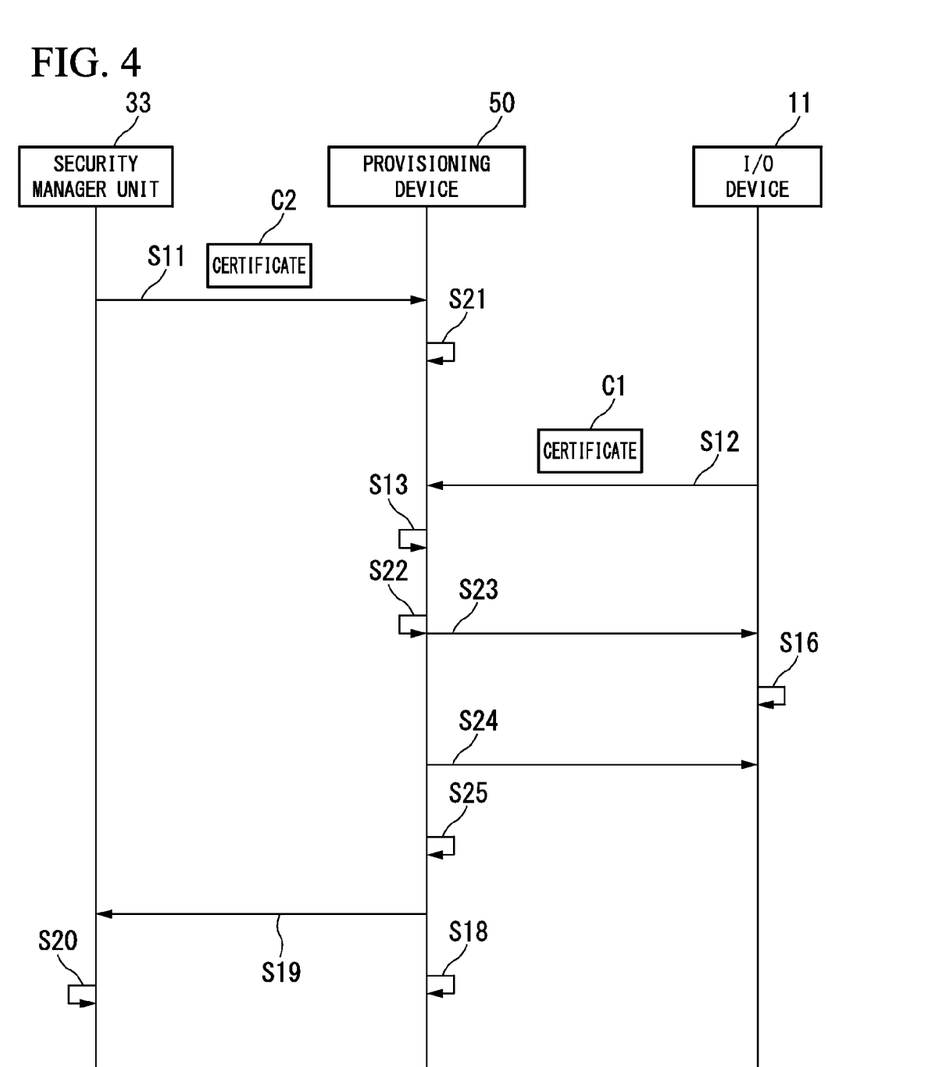
FIG. 4 is a timing chart illustrating processing at the time of provisioning according to a second embodiment of the present invention.

FIG. 4 is a timing chart illustrating processing at the time of provisioning according to the second embodiment of the present invention. Here, like reference symbols are appended to like processes shown in FIGS. 3 and 4. As shown in FIG. 4, before provisioning is initiated, a worker obtains the certificate C2 stored in the security manger unit 33 of the gateway 30 and inputs the obtained certificate C2 to the provisioning device 50 (step S11: first step), similarly to the first embodiment.

After the provisioning is initiated, the worker first inputs encoding instruction information to the provisioning device 50 (step S21). Here, the encoding instruction information is information that specifies information to be encoded from among the information included in apparatus information to be transmitted by the provisioning device 50 to the I/O device 11 (including the apparatus information included in the provisioning information output from the provisioning device 50 to the security manager unit 33).

Figure 5:
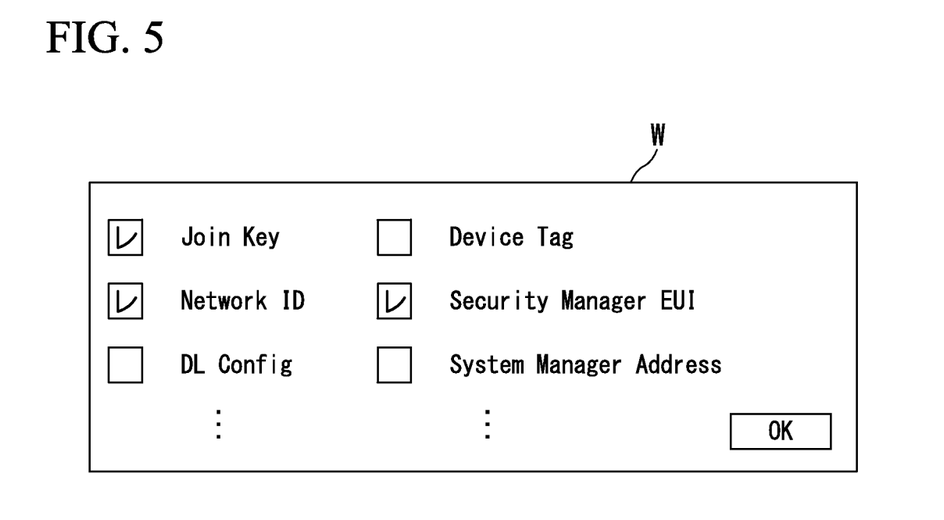
FIG. 5 is a diagram illustrating an example of a window for selecting encoding instruction information according to the second embodiment of the present invention.

Specifically, a selection window W shown in FIG. 5 is displayed on a display unit (not shown) of the provisioning device 50. Then, the worker selects an item displayed on the selection window W by operating an operation unit (not shown) of the provisioning device 50, thereby inputting the above encoding instruction information. FIG. 5 is a diagram illustrating an example of a window for selecting encoding instruction information according to the second embodiment of the present invention. As shown in FIG. 5, a selectable item is associated with a checkbox on the selection window W. Then, the worker checks the checkbox (checkbox associated with an item necessary to be encoded), thereby inputting encoding instruction information.

Here, in the example shown in FIG. 5, the selectable items include: the aforementioned join key; a device tag; a network ID; a security manager EUI; a system manager address; DL Config; and the like.

After the input of the encoding instruction information is completed, infrared communication is performed between the provisioning device 50 and the I/O device 11 based on an instruction received from the worker, thus transmitting and inputting to the provisioning device 50, the certificate C1 and the identification information which are stored in the I/O device 11 (step S12: first step). Then, the provisioning device 50 generates a join key to be set to the I/O device 11, similarly to the first embodiment (step S13).

After the join key is generated, the provisioning device 50 performs a process of encoding the join key using the public key included in the certificate C1 obtained from the I/O device 11. Here, among the apparatus information to be set to the I/O device 11, only the information specified by the encoding instruction information input in step S21 is encoded (step S22: second step).

After the encoding is complete, infrared communication is performed between the provisioning device 50 and the I/O device 11, thus transmitting the encoded join key to the I/O device 11 (step S23: second step). Here, upon receiving the encoded join key from the provisioning device 50, the I/O device 11 performs a process of decoding the join key using the private key stored in the I/O device 11 (step S16).

Then, infrared communication is performed between the provisioning device 50 and the I/O device 11, and thus transmitting to the I/O device 11, the remaining uncoded apparatus information among the apparatus information to be set to the I/O device 11 (step S24). When the apparatus information (uncoded apparatus information) is received, the received uncoded apparatus information is set to the I/O device 11 along with the apparatus information decoded in step S16.

On the other hand, the provisioning device 50 having completed the transmission of the join key (steps S23 and 24) performs a process of generating and encoding provisioning information. Specifically, the provisioning device 50 generates provisioning information in which the identification information obtained from the I/O device 11 in step S12 is associated with the apparatus information including the join key generated in step S13. Then, the provisioning device 50 encodes the provisioning information using the public key included in the certificate C2 input in step S11.

Here, among the apparatus information included in the provisioning information, only the information specified by the encoding instruction information input in step S21 is encoded (step S25: third step). Here, similar to the first embodiment, in a case where there are multiple I/O devices 11 to be subjected to provisioning, the processes from steps S12, S13, S16, and S22 to S25 are repeated a number of times corresponding to the number of I/O devices 11.

After the above processes are completed, the provisioning information generated in step S25 (the provisioning information encoded based on the encoding instruction information) is output from the provisioning device 50 to the management terminal device 40, similarly to the first embodiment (step S19: third step). Here, after the encoded provisioning information is output, the provisioning device 50 performs a process of deleting the join key generated in step S13 (step S18: fourth step). Upon receiving the encoded provisioning information, the security manger unit 33 performs a process of decoding the provisioning information using the private key stored in the security manger unit 33 (step S20). Thus, the decoded provisioning information is set to the security manager unit 33.

As explained above, also in the present embodiment, similar to the first embodiment, the provisioning device 50 encodes apparatus information (join key) to be set to the I/O device 11, using the public key included in the certificate C1, and outputs the encoded apparatus information to the I/O device 11. Additionally, the provisioning device 50 encodes, using the public key included in the certificate C2, provisioning information in which the apparatus information is associated with the identification information, and outputs the encoded provisioning information to the security manager unit 33 of the gateway 30. For this reason, it is possible to prevent the apparatus information from being stolen between the provisioning device 50 and the I/O device 11, and between the provisioning device 50 and the security manager unit 33 of the gateway 30, thereby enhancing the security.

Additionally, in the present embodiment, it is possible for a worker to specify, by operation of the provisioning device 50, information to be encoded, from among the information included in the apparatus information to be transmitted to the I/O device 11 (including the apparatus information included in the provisioning information output from the provisioning device 50 to the security manager unit 33). For this reason, it is possible to freely select information to be encoded, in accordance with security policy defined by a plant manager, or the security level required for each plant or each field apparatus.

(Third Embodiment)

Next, a third embodiment of the present invention is explained here. The entire configuration and basic processing of a wireless communication system of the present embodiment are similar to those of the wireless communication systems of the first and second embodiments. Additionally, in the wireless communication system of the present embodiment, similar to the wireless communication system of the second embodiment, it is possible to select a scope of encoding apparatus information (including the apparatus information included in the provisioning information). However, the wireless communication system of the present embodiment differs from that of the second embodiment in that the scope to be encoded is specified by encoding instruction information transmitted from the security manager unit 33.

Figure 6:
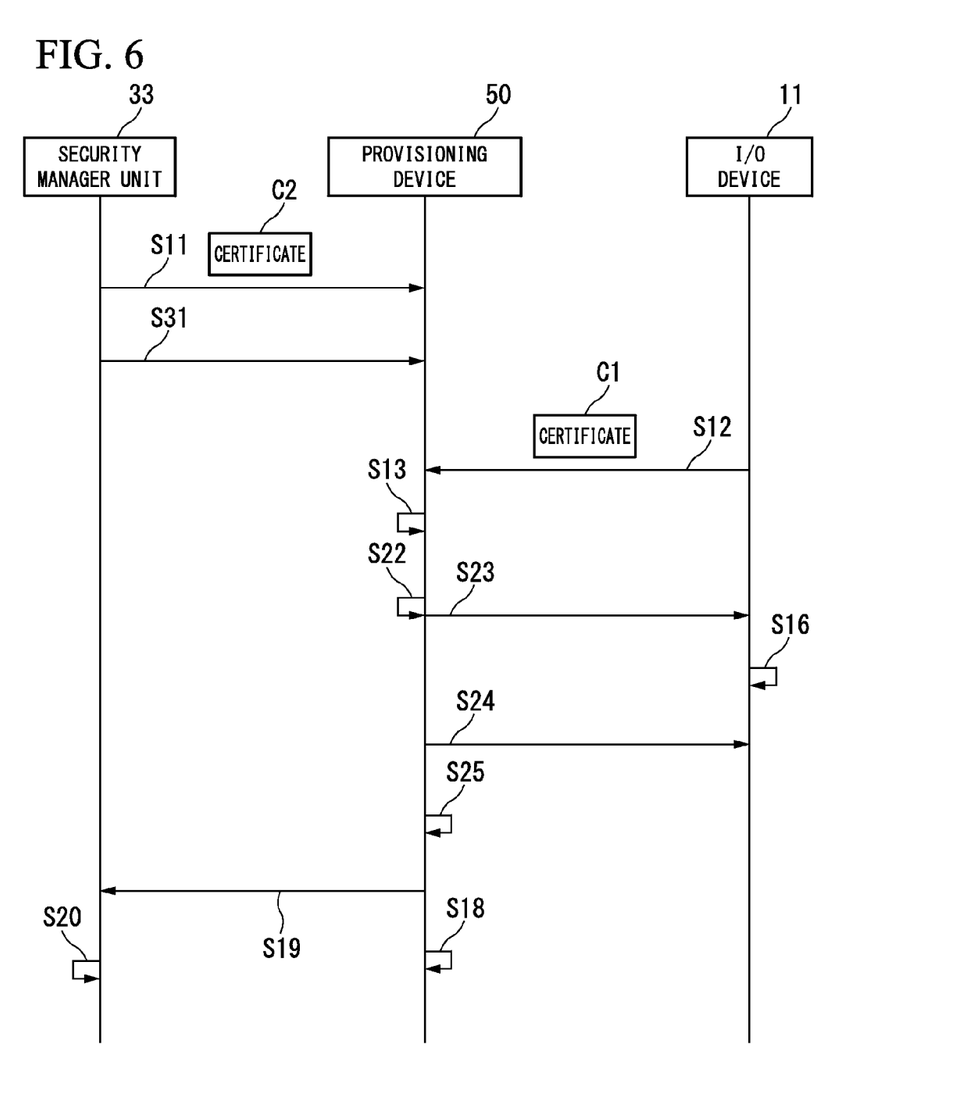
FIG. 6 is a timing chart illustrating processing at the time of provisioning according to a third embodiment of the present invention.

FIG. 6 is a timing chart illustrating processing at the time of provisioning according to the third embodiment of the present invention. Here, like reference symbols are appended to like processes shown in FIGS. 4 and 6. As shown in FIG. 6, in the present embodiment, a process of outputting encoding instruction information from the security manager unit 33 to the provisioning device 50 (step S31) is provided in lieu of the process of inputting the encoding instruction information (step S21) shown in FIG. 4.

In other words, in the present embodiment, encoding instruction information generated by, for example, a plant manager is output from the security manager unit 33, and is input to the provisioning device 50 via a USB memory or the like, along with the certificate C2. Then, in step S22, apparatus information is encoded based on the encoding instruction information received from the security manager unit 33. Then, in step S25, provisioning information is generated using the apparatus information encoded based on the encoding instruction information received from the security manager unit 33.

As explained above, also in the present embodiment, similar to the first and second embodiments, it is possible to prevent the apparatus information from being stolen between the provisioning device 50 and the I/O device 11, and between the provisioning device 50 and the security manager unit 33 of the gateway 30, thereby enhancing the security. Additionally, in the present embodiment, information included in the apparatus information (including the apparatus information included in the provisioning information) is encoded based on the encoding instruction information received from the security manager unit 33. For this reason, it is possible for a worker who operates the provisioning device 50 to perform an adequate encoding process in accordance with security policy defined by a plant manager, or the security level required for each plant or each field apparatus, even if the worker does not know the security policy or the security level.

(Fourth Embodiment)

Next, a fourth embodiment of the present invention is explained here. The entire configuration and basic processing of a wireless communication system of the present embodiment are similar to those of the wireless communication systems of the first to third embodiments. However, the wireless communication system of the present embodiment differs from those of the first to third embodiments in that apparatus information including the join key, which is to be set to the I/O device 11, is generated by the security manager unit 33.

Figure 7:
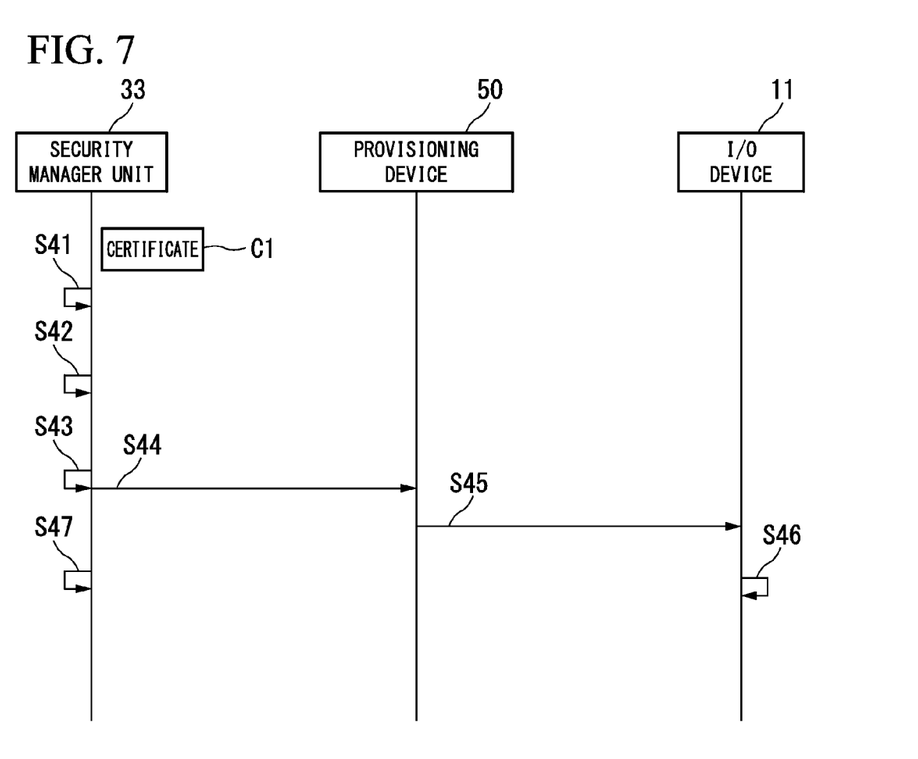
FIG. 7 is a timing chart illustrating processing at the time of provisioning according to a fourth embodiment of the present invention.

FIG. 7 is a timing chart illustrating processing at the time of provisioning according to the fourth embodiment of the present invention. In the present embodiment, first, before provisioning is initiated, a process of inputting to the security manager unit 33 of the gateway 30, the certificate C1 and the identification information which are stored in the I/O device 11 is performed (step S41: first step).

For example, a worker obtains, by infrared communication through her operation of the provisioning device 50, the certificate C1 and the identification information which are stored in the I/O device 11. Then, the worker inputs the obtained certificate C1 and the identification information to the management terminal device 40 using a USB memory or the like. Based on, for example, an instruction from the operator, the certificate C1 and the identification information input to the management terminal device 40 are transmitted and input to the security manager unit 33 of the gateway 30 via the plant network N2. Here, in a case where the certificate C1 and the identification information which are stored in the I/O device 11 are included in information managed by the plant manager (such as information concerning the design of a plant), the plant manager may operate the management terminal device 40 and input those information items to the security manger unit 33.

Then, the security manager unit 33 generates apparatus information including a join key, which is to be set to the I/O device 11 (step S42). After the apparatus information including the join key is generated, the security manager unit 33 performs a process of encoding the join key using the public key included in the certificate C1 input in step S41 (step S43: second step). After the encoding is completed, the encoded apparatus information is output from the security manager unit 33 to the management terminal device 40 via the plant network N2.

After the encoded apparatus information is input to the management terminal device 40, for example, the encoded apparatus information is output to a USB memory attached onto the management terminal device 40. Then, the USB memory is attached onto the provisioning device 50, thereby inputting the encoded apparatus information to the provisioning device 50 (step S44: second step). After the encoded apparatus information is input to the provisioning device 50, infrared communication is performed between the provisioning device 50 and the I/O device 11 based on an instruction from the worker, thereby transmitting the encoded apparatus information to the I/O device 11 (step S45: second step).

Upon receiving the encoded apparatus information from the provisioning device 50, the I/O device 11 performs a process of decoding the join key using the private key stored in the I/O device 11 (step S46). Thus, the decoded apparatus information is set to the I/O device 11. On the other hand, the security manager unit 33 performs a process of generating provisioning information in which the identification information of the I/O device 11 input in step S41 is associated with the apparatus information including the join key generated in step S42, and then setting the generated provisioning information to the security manager unit 33 (step S47: third step).

As explained above, in the present embodiment, the security manager unit 33 of the gateway 30 obtains the certificate C1 and the identification information which are stored in the I/O device 11. Then, the security manager unit 33 generates apparatus information (join key) to be set to the I/O device 11, encodes the generated apparatus information using the public key included in the certificate C1, and outputs the encoded apparatus information to the I/O device 11. Additionally, the security manager unit 33 generates provisioning information in which the apparatus information is associated with the identification information.

For this reason, among the security manager 33 of the gateway 30, the provisioning device 50, and the I/O device 11, the encoded apparatus information is transmitted via the plant network N2, via a USB memory, and via infrared communication, thereby preventing the apparatus information from being stolen. Additionally, the provisioning information is generated in the security manager unit 33 and is not output therefrom, thereby preventing the apparatus information from being stolen. Thus, it is possible to enhance the security in the present embodiment, similarly to the other embodiments.

Although the information setting methods and the wireless communication systems according to the embodiments of the present invention have explained above, it is apparent that the present invention is not limited to the above embodiments, and may be modified and changed without departing from the scope of the invention. For example, although it has been explained in the fourth embodiment that all the apparatus information output from the security manager unit 33 are encoded, the apparatus information may be partially encoded based on encoding instruction information, similarly to the second and third embodiments.

Additionally, the explanations have been given with respect to the embodiments where the gateway unit 31, the system manager unit 32, and the security manger unit 33 are included in the gateway 30. However, the functions of the gateway unit 31, the system manager unit 32, and the security manger unit 33 may be implemented as those of different devices. Further, the function of performing wireless communication with the I/O devices 10a to 10e and the routing devices 20a and 20b may be removed from the gateway unit 31 and be implemented as a function of a wireless access point device.

Further, the explanations have been given in the above embodiments with respect to the example of the wireless communication system that performs wireless communication based on the ISA100.11a. However, the present invention is also applicable to a wireless communication system that performs wireless communication based on WirelessHART (trademark).

As used herein, the following directional terms "forward," "rearward," "above," "downward," "vertical," "horizontal," "below," and "transverse," as well as any other similar directional terms refer to those directions of an apparatus equipped with the present invention. Accordingly, these terms, as utilized to describe the present invention should be interpreted relative to an apparatus equipped with the present invention.

The term "configured" is used to describe a component, section or part of a device which includes hardware and/or software that is constructed and/or programmed to carry out the desired function.

The terms of degree such as "substantially," "about," and "approximately" as used herein mean a reasonable amount of deviation of the modified term such that the end result is not significantly changed. For example, these terms can be construed as including a deviation of at least ±5 percent of the modified term if this deviation would not negate the meaning of the word it modifies.

What is claimed is:

1. An information setting method for a setting device, comprising:
    obtaining a first certificate and identification information from a wireless device to be caused to join a wireless network managed by a management device, the first certificate certifying that the wireless device is a formal wireless device, the first certificate including a first public key, the identification information being information that identifies the wireless device, and the first certificate and the identification information being stored in the wireless device;
    obtaining a second certificate from the management device, the second certificate certifying that the management device is a formal management device, and the second certificate including a second public key;
    encoding, using the first public key, apparatus information required for the wireless device to join the wireless network;
    outputting the encoded apparatus information to the wireless device;
    encoding, using the second public key, management information including the apparatus information and the identification information associated with the apparatus information; and
    outputting the encoded management information to the management device,
    wherein encoding the apparatus information comprises:
    obtaining encoding instruction information that specifies a part of the apparatus information to be encoded; and
    encoding the part of the apparatus information.

2. The information setting method according to claim 1, wherein encoding the management information comprises encoding the part of the apparatus information.

3. The information setting method according to claim 1, wherein obtaining the encoding instruction information comprises any one of:
    obtaining the encoding instruction information by an operator of the setting device operating the setting device; and
    obtaining the encoding instruction information from the management device.

4. The information setting method according to claim 1, further comprising:
    before encoding the apparatus information, generating the apparatus information; and
    after outputting the encoded management information, deleting the apparatus information.

5. The information setting method according to claim 1, wherein obtaining the first certificate and the identification information comprises performing infrared communication with the wireless device to obtain the first certificate and the identification information.

6. The information setting method according to claim 1, wherein obtaining the second certificate comprises:
   detaching a USB memory storing the second certificate from the management device; and
   attaching the USB memory onto the setting device.

7. An information setting method for a management device, comprising:
   obtaining a first certificate and identification information from a wireless device to be caused to join a wireless network managed by the management device, the first certificate certifying that the wireless device is a formal wireless device, the first certificate including a first public key, the identification information being information that identifies the wireless device, and the first certificate and the identification information being stored in the wireless device;
   encoding, using the first public key, apparatus information required for the wireless device to join the wireless network;
   outputting the encoded apparatus information to a setting device configured to set the apparatus information to the wireless device; and
   generating management information including the apparatus information and the identification information associated with the apparatus information,
   wherein encoding the apparatus information comprises:
   obtaining encoding instruction information that specifies a part of the apparatus information to be encoded; and
   encoding the part of the apparatus information.

8. The information setting method according to claim 7, wherein obtaining the encoding instruction information comprises obtaining the encoding instruction information by an operator of the management device operating the management device.

9. The information setting method according to claim 7, further comprising:
   receiving from the wireless device, a join request including a join key included in the apparatus information;
   authenticating the wireless device based on the join key; and
   allowing the wireless device to join the wireless network in a case that authentication succeeds.

10. A wireless communication system comprising:
    a wireless device to be caused to join a wireless network, the wireless device storing a first certificate and identification information, the first certificate certifying that the wireless device is a formal wireless device, the first certificate including a first public key, and the identification information being information that identifies the wireless device;
    a management device configured to manage the wireless network, the management device storing a second certificate certifying that the management device is a formal management device, and the second certificate including a second public key; and
    a setting device configured to
    obtain the first certificate and the identification information from the wireless device,
    obtain the second certificate from the management device,
    encode, using the first public key, apparatus information required for the wireless device to join the wireless network,
    output the encoded apparatus information to the wireless device,
    encode, using the second public key, management information including the apparatus information and the identification information associated with the apparatus information, and
    output the encoded management information to the management device,
    wherein the setting device is configured to
    obtain encoding instruction information that specifies a part of the apparatus information to be encoded, and
    encode the part of the apparatus information.

11. The wireless communication system according to claim 10, wherein the setting device is configured to encode the part of the apparatus information to encode the management information.

12. The wireless communication system according to claim 10, wherein the setting device is configured to
    obtain the encoding instruction by an operator of the setting device operating the setting device, or
    obtain the encoding instruction from the management device.

13. The wireless communication system according to claim 10, wherein the setting device is configured to
    generate the apparatus information before encoding the apparatus information, and
    delete the apparatus information after outputting the encoded management information.

14. The wireless communication system according to claim 10, wherein the setting device is configured to perform infrared communication with the wireless device to obtain the first certificate and the identification information.

15. The wireless communication system according to claim 10, wherein the wireless device stores a first private key associated with the first public key, and
    the wireless device is configured to decode the encoded apparatus information using the first private key.

16. The wireless communication system according to claim 10, wherein the management device stores a second private key associated with the second public key, and
    the management device is configured to decode the encoded management information using the second private key.

17. The wireless communication system according to claim 10, wherein the wireless device is configured to transmit to the management device, a join request including a join key included in the apparatus information, and
    the management device is configured to
    receive the join request from the wireless device,
    authenticate the wireless device based on the join key, and
    allow the wireless device to join the wireless network in a case that authentication succeeds.

* * * * *